United States Patent [19]

Sidhwa

[11] Patent Number: 4,580,057
[45] Date of Patent: Apr. 1, 1986

[54] NEUTRON DETECTOR AMPLIFIER CIRCUIT

[75] Inventor: Feroze J. Sidhwa, Coppell, Tex.

[73] Assignee: Mobil Oil Corporation, New York, N.Y.

[21] Appl. No.: 489,911

[22] Filed: Apr. 29, 1983

[51] Int. Cl.[4] ............................................. G01T 3/00
[52] U.S. Cl. .................................................. 250/392
[58] Field of Search ........................ 250/392, 391, 390

[56] References Cited

U.S. PATENT DOCUMENTS 4,293,819 10/1981 Shibayama et al. ...................... 330/9

OTHER PUBLICATIONS

G. P. Westphal, "A High Precision Pulse-Ratio Circuit", *Nuclear Instruments and Methods*, vol. 134, No. 2 (Apr. 15, 1976) pp. 387–390.

*Primary Examiner*—Alfred E. Smith
*Assistant Examiner*—Constantine Hannaher
*Attorney, Agent, or Firm*—A. J. McKillop; Michael G. Gilman; Frank J. Kowalski

[57] ABSTRACT

A neutron detector system is disclosed wherein a neutron charge amplifier discriminator circuit is used in conjunction with a neutron detector enabling detection of nuclear events, amplification of extremely small signals, conditioning of the signals, further amplification of the signal, discrimination of the signals, conversion into digital form and counting for a predetermined time period.

3 Claims, 1 Drawing Figure

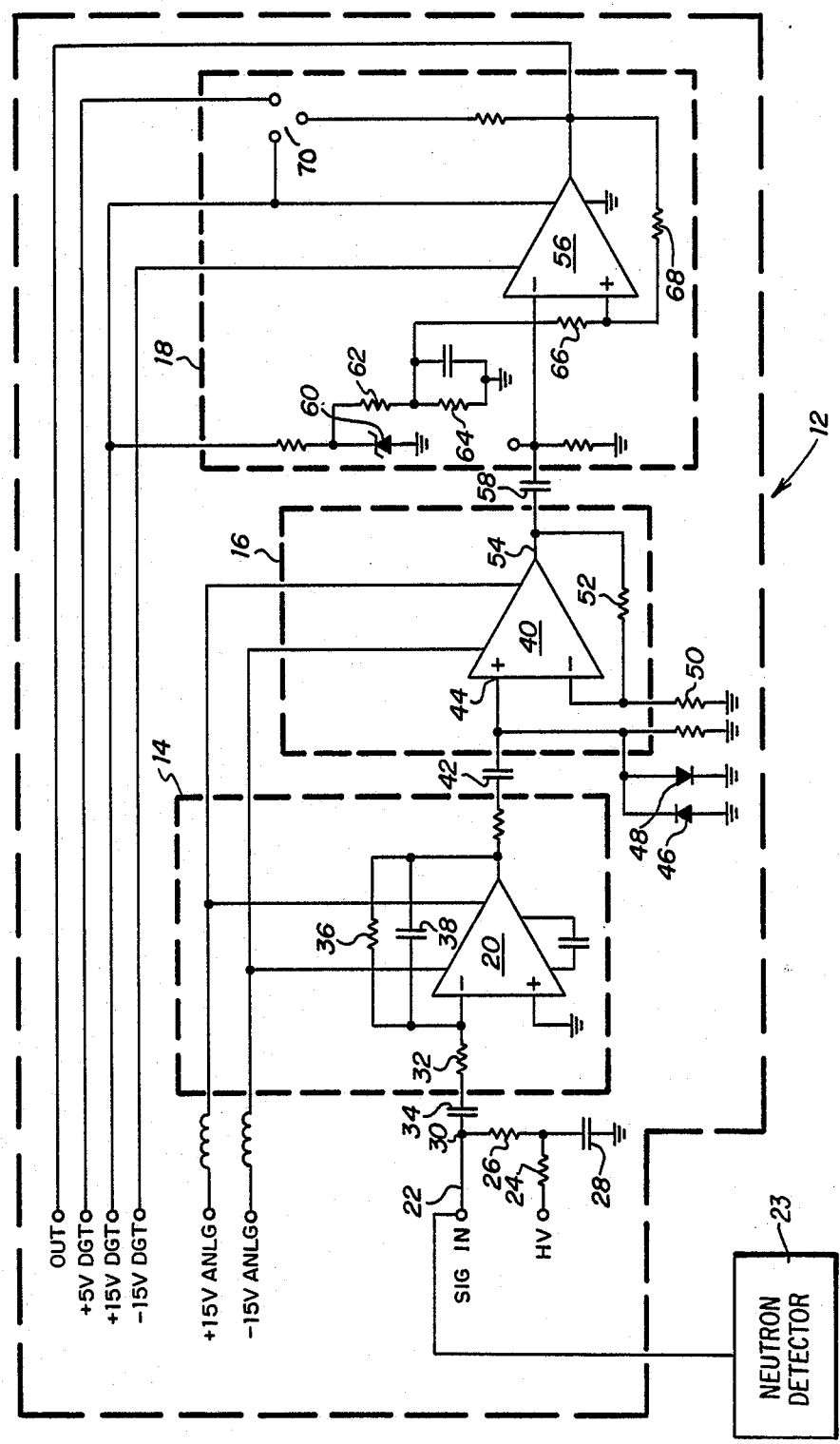

NEUTRON DETECTOR AMPLIFIER CIRCUIT

BACKGROUND OF THE INVENTION

In present day hydrocarbon exploration many tools are used, from initial seismic exploration to logging equipment when a well has been drilled. One such piece of logging equipment is the neutron logging tool.

Neutron logs are used for determination of porous foundations and their porosity. They respond primarily to the amount of hydrogen present in the formation. Thus, in clean formations, that is where there has not been invasion by drawing mud, whose pores are filled with water or oil, the neutron log reflects the amount of liquid filled porosity.

Gas zones can be identified by comparing the neutron log with other porosity log or a core analysis. A combination of the neutron log with one or two other porosity logs yields even more accurate porosity values and lithology identification, including the evaluation of shale content.

Neutrons are electrically neutral particles, each having a mass almost identical to the mass of a hydrogen atom. High energy neutrons are continuously emitted from a radioactive source which is mounted in the Sonde. These neutrons collide with nuclei of the formation material in what is termed an elastic "billiard ball" type of collision. With each collision a neutron loses some of its energy.

The amount of energy lost per collision depends on the relative mass of the nucleus with which the neutron collides. The greatest energy loss occurs when the neutron strikes a nucleus of practically equal mass such as a hydrogen nucleus. Collisions with heavier nuclei do not cause as great an energy loss. The energy loss of neutrons from the neutron logging tool depends primarily on the amount of hydrogen in the formation.

When the hydrogen concentration of the material surrounding the neutron source is large, most of the neutrons have a great energy loss within a short distance of the source. However, if the hydrogen concentration is small, the neutrons travel farther from the source before incurring a great energy loss. Accordingly, the counting rate of the detector increases for decreased hydrogen concentration and decreases for the absence of hydrogen.

A neutron detector generally comprises a gas filled detector used in conjunction with a charged coupled amplifier, post amplifier and a discriminator.

The neutron detector generally comprises a charged coupled amplifier used in conjunction with a post amplifier and a discriminator. Normally the charge amplifier must be separated physically from three to four feet from the post amplifier and discriminator. Unfortunately, this type of system used to discriminate the analog pulses is prone to temperature drifts. Furthermore, shielding the connections between the charge amplifier and the post amplifier becomes an increasing problem as the distance between the two is increased.

SUMMARY OF THE INVENTION

The present invention discloses an electronic circuit for use as a neutron detector wherein an ultra-fast field effect transistor input operational amplifier is used in a charge coupled amplifier configuration. A second stage, a post-amplifier includes a wide band operational amplifier in a non-inverting gain stage, with provision for setting gain. A discriminator including a precision high input impedance comparator is used which also provides proper amounts of hysterisis. A temperature reference diode is included to provide appropriate stable reference voltage to the comparator. Thus, the neutron detector circuitry may all be placed on a single printed circuit board, having only the section of the printed circuit board which contains the charge amplifier shielded.

BRIEF DESCRIPTION OF THE DRAWING

The attached drawing is a schematic drawing illustrating a neutron charge amplifier discriminator circuit.

DESCRIPTION OF THE PREFERRING EMBODIMENT

The neutron detector 12 of the present invention is illustrated in FIG. 1 as comprising three stages, charge amplifier 14, post amplifier 16 and discriminator stage 18.

Charge amplifier 14 is of the inverting type and is built around amplifier unit 20 which is preferably a LH0032 field effect transistor input amplifier. However, any amplifier having a high input impedance, a slew rate of approximately 500 volts per microsecond and good temperature characteristics may be used. Input 22 to charge amplifier 14 is provided by the output of an epithermal or thermal neutron detector 23, since either may be used in conjunction with the present invention.

Charge amplifier 14 is illustrated as having resistors 24 and 26 and capacitor 28 forming input 22 at node 30. These components provide high voltage filtering. Resistor 32 in conjunction with capacitor 34 limit the upper response frequency of amplifier unit 20. Resistor 36 connected in parallel with capacitor 38, both connected between the input and output of amplifier unit 20 limit the lower cut off frequency of amplifier unit 20. Capacitor 38 determines the gain of amplifier unit 20 and preferably has good temperature characteristics.

Due to the high input impedance of amplifier unit 20 and the neutron detectors, amplifier unit 20 is susceptible to noise pick up, and is preferably shielded. A neutron generator, such as AmBe may be placed near the neutron detector 23 and the output of amplifier unit 20 should be approximately forty millivolts pulses.

Preferably the gain of amplifier unit 20 is not varied since a change in gain is controlled by changing capacitor 38, which also changes the frequency characteristics of amplifier unit 20.

Post amplifier stage 16 is illustrated as including operational amplifier 40 which is capacitively coupled to amplifier unit 20 through capacitor 42 at input terminal 44. Diodes 46 and 48 are connected to input terminal 44 as input protection to operational amplifier 40.

The gain of operational amplifier 40 is determined by the ratio of resistors 50 and 52. The transfer function of operational amplifier 40 is as follows:

Gain = $E_{out}/E_{in}$ = 1 + (resistor 52/resistor 50)

Preferably, resistor 50 is chosen to provide a gain between two hundred and four hundred, however other values of gain may prove satisfactory.

Normally, an AmBe source is placed close to a neutron detector 23 and the gain of operational amplifier 40 is adjusted through resistor 50 to produce an output of approximately seven volts at output terminal 54.

The output of operational amplifier 40 is coupled to the input of discriminator amplifier 56 of discriminator stage 18 through capacitor 58. Discriminator amplifier 56 is preferably an LF311H high speed field effect transistor input type. A reference diode 60 provides the reference voltage for discriminator amplifier 56. The voltage across reference diode 60 is impressed on a voltage divider network comprising resistors 62 and 64 to obtain an appropriate reference voltage. Resistors 66 and 68 are used to provide hysterisis. Resistor 64 determines the value of the threshold voltage of discriminator amplifier 56.

In operation, charge amplifier 14 is used to amplify signals representing neutron events. Neutrons are detected by a neutron detector 23 whose output is fed into the signal input 22 of charge amplifier 14. The signal is of a very very small amplitude in the order of nanovolts or even picovolts. This signal is riding on a high voltage of approximately 1200 to 1500 volts. In other words, the input to charge amplifier 14 is approximately 1200 to 1500 volts with only the nano or pico volt ripple containing the desired information. This input signal is capacitively coupled into the charge amp 20. Charge amp 20 is to receive a signal of the incoming charge and converts it to an output voltage. Capacitor 38 controls the gain of amplifier 20 and resistors 36 and 32 control the low pass roll off and the high pass roll off respectively of charge amplifier unit 14. The signal coming out of the amplifier 20 is approximately 40 millivolts peak signal. This signal is taken and capacitively coupled through capacitor 42 to input terminal 44 of amplifier 40. Amplifier 40 amplifies the 40 millivolt signal up to approcimately 6 or 7 volts.

The gain of amplifier 40 is approximately 300. The output signal at terminal 54 must be discriminated, that is have a threshold level fixed and discriminate between signals above and below the predetermined threshold level. Discriminator amplifier 56, which is a precision high frequency comparator is set for a predetermined threshold by selecting resistor 62 and resistor 64, which are also precision components having good temperature characteristics. The capacitor in parallel with resistor 64, acts as a noise filter on the reference voltage so that the reference is very clean on the input of discriminator amplifier 56. Resistors 66 and 68 are used to provide proper hysterisis for discriminator amplifier 56. The signal coming in on the minus side of amplifier 56 is discriminated against the voltage on the plus side of amplifier 56. The resulting signal, the output of amplifier 56 is in a digital form. When the incoming signal crosses the threshold set by resistor 66 the output is a pulse and when it is below the threshold the output of amplifier 56 is zero. The output of amplifier 56 provides a neutron output by the number of output pulses. The number of neutrons striking the neutron detector determines the number of pulses in the output pulse train of amplifier 56. The output signal may be programmed to be of a level from zero to 15 V or 0 to 5 V by modifying the connections on three pole switch 70.

While the present invention has been illustrated by way of preferred embodiment, it is to be understood that it is not limited thereto but only by the scope of the following claims:

What is claimed is:

1. A neutron charge amplifier circuit comprising:
   neutron detector for counting incident neutrons and producing an electrical signal in response thereto;
   gain means close coupled to said neutron detector for receiving wherein said electrical signal is combined with a high voltage signal to provide an input signal and amplifying said input signal and producing an amplified signal; and
   discriminator means connected to said gain means for receiving said amplified signal and producing a digital signal representative of said electrical signal.

2. A neutron charge amplifier circuit according to claim 1 wherein said gain means includes an ultra fast field effect transistor operational amplfier.

3. A neutron charge amplifier circuit according to claim 2 wherein said gain means also includes a wide band operational amplifier configured as a non-inverting gain stage.

* * * * *